United States Patent [19]
Balde

[11] 3,764,727
[45] Oct. 9, 1973

[54] ELECTRICALLY CONDUCTIVE FLAT CABLE STRUCTURES

[75] Inventor: John William Balde, Flemington, N.J.

[73] Assignee: Western Electric Company, Incorporated, New York, N.Y.

[22] Filed: June 12, 1972

[21] Appl. No.: 261,862

[52] U.S. Cl. ............ 174/34, 174/117 FF, 333/84 M
[51] Int. Cl. ...................... H01b 7/08, H01b 11/02
[58] Field of Search .................... 174/33, 34, 117 R, 174/117 F, 117 FF, 113; 333/73 S, 81 A, 84 M; 336/187

[56] References Cited
UNITED STATES PATENTS

| | | | |
|---|---|---|---|
| 3,546,357 | 12/1970 | MacPherson | 174/34 |
| 3,058,070 | 10/1962 | Reingold et al. | 333/84 M |
| 2,667,543 | 1/1954 | Smith et al. | 174/33 |
| 1,792,273 | 2/1931 | Byk et al. | 174/34 |
| 2,038,240 | 4/1936 | Schelkunoff | 174/34 X |
| 2,550,891 | 5/1951 | Wald | 174/34 X |

FOREIGN PATENTS OR APPLICATIONS

| | | | |
|---|---|---|---|
| 1,402,897 | 5/1965 | France | 174/34 |

Primary Examiner—Bernard A. Gilheany
Assistant Examiner—A. T. Grimley
Attorney—W. M. Kain et al.

[57] ABSTRACT

A flat cable structure includes a number of pairs of longitudinally extending conductors in a substantially flat array. The conductors of each pair are spaced laterally from one another except at periodic locations where the conductors of the pair exchange lateral positions by crossing over one another. The crossing periodicities differ in adjacent pairs of conductors in the array.

Several arrays may be stacked one upon another. Each successive array in the stack may have a laterally varying pattern of crossing periodicities reversed from that of the preceding array. The arrays are patterned so as to avoid the alignment of pairs of conductors with like crossing periodicity in adjacent arrays when the arrays are properly aligned in a stack and, in certain instances, even where there is one track or more than one track misalignment between adjacent arrays in a stack. The overall pattern of crossing periodicities along the length of each array is repetitive, facilitating cable termination.

36 Claims, 15 Drawing Figures

PATENTED OCT 9 1973 3,764,727

| A B C D E |
| A B C D E |
| A B C D E |
| A B C D E |
| A B C D E |

*FIG. 4*

| A B C D E | — ⓐ |
| F G H I J | — ⓑ |
| A B C D B | — ⓐ |
| F G H I J | — ⓑ |
| A B C D E | — ⓐ |

*FIG. 5*

| A B C D E |
| E D C B A |
| A B C D E |
| E D O B A |
| A B O D E |

*FIG. 6*

| A B C D E F |
| F E D C B A |
| A B C D E F |
| F E D C B A |
| A B C D E F |

*FIG. 7*

| A B C D E F |
| F E D C B A |
| A B C D E F |
| F E D C B A |
| A B C D E F |

| A B C D E F O O C B A F E D |

| D E F A B C O O F E D C B A |

| A B C D E F O O C B A F E D |    FIG. 13

| D E F A B C O O F E D C B A |

| A B C D E F O O C B A F E D |

| A B C D E F G H O O O D C B A H G F E |

| E F G H A B C D O O O H G F E D C B A |

| A B C D E F G H O O O D C B A H G F E |    FIG. 14

| E F G H A B C D O O O H G F E D C B A |

| A B C D E F G H O O O D C B A H G F E |

| A B C D A B C D | — (a)

| C D A B C D A B | — (b)

| A B C D A B C D | — (a)   FIG. 15

| C D A B C D A B | — (b)

| A B C D A B C D | — (a)

ELECTRICALLY CONDUCTIVE FLAT CABLE STRUCTURES

BACKGROUND OF THE INVENTION

This invention relates to electrically conductive structures, such as flat cables, and, more particularly, to flat cable structures wherein crosstalk effects between different pairs of conductors in a flat cable are substantially reduced.

The use of flat cables is well known in the electronics industry as a means of electrical systems interconnection. Among the advantages provided by flat cables are simple, low cost systems assembly and ease in mass termination, since all the conductors of a flat cable are fixed in known relationship to one another in a flat, easy to handle array. Such cables may be manufactured, for example, by coating and laminating operations or by etching or additive deposition techniques.

A disadvantageous condition which may accompany the use in telecommunications of flat cable is the presence of audio frequency crosstalk effects between closely positioned circuits. This factor is not restricted to flat cable, and has been alleviated in round cable through the use in such cable of twisted pairs of insulated conductors, the various wire pairs being twisted at several different twist periodicities. Each twist in a pair of wires provides a transposition of each wire in the pair with respect to corresponding wires of other nearby pairs of wires which are not twisted at a like longitudinal position. The transposition tends to minimize crosstalk effects between the pair of wires twisted at the particular longitudinal position and the nearby pairs of wires not twisted at the particular longitudinal position. A complete discussion of the crosstalk reduction phenomenon may be found in Principles of Electricity Applied to Telephone and Telegraph Work (Long Lines Department, American Telephone and Telegraph Company, 1961), pages 334–344.

A known flat cable structure was disclosed in a paper, Flat Conductor Cable Manufacture and Installation Techniques, presented at the Fifteenth Annual Wire and Cable Symposium, Atlantic City, N.J., Dec. 7–9, 1966, by Wilhelm Angele of the National Aeronautics and Space Administration. This prior art flat cable structure incorporates pairs of spaced conductors which extend in like longitudinal direction, the conductors of each pair crossing over one another at regular intervals. The crossing periodicity is alike for each pair of conductors, the crossings occurring in all conductor pairs at like longitudinal positions. The effect is generally similar to that which would be present in a round cable incorporating pairs of wires twisted at like twist periodicities. There is no known disclosure in the prior art of a flat cable structure wherein the conductors of longitudinally extending conductor pairs cross over one another at varying cross periodicities.

It has been observed that the prior art flat cable structure, which employs pairs of longitudinally extending conductors with the conductors of each pair crossing over one another at like periodicity, provides a reduction in crosstalk from any external radiation source, but does not provide any significant reduction of crosstalk between wires in the cable.

It should be clear that the provision of a flat cable structure with significant crosstalk reducing capabilities, yet preserving the low cost and easy mass termination features of known flat cable structure, would be a most desirable achievement in the field of telecommunications.

SUMMARY OF THE INVENTION

An object of the invention resides in the provision of new and improved electrically conductive structures, particularly flat cable structures which afford a substantial reduction in crosstalk between pairs of conductors in a flat cable.

The invention contemplates the use of flat cable which incorporates a number of pairs of longitudinally extending conductors in a substantially flat array. Any conventional flat cable type may be involved, e.g., dielectric tape with conductive paths on opposite major surfaces of the tape, or pairs of insulated wires woven, laminated or otherwise joined together. The conductors of each pair in the substantially flat array are spaced laterally from one another except at periodic locations where the conductors cross over one another. The periodicities of the crossings differ in adjacent pairs of conductors in the array.

Several arrays are to be stacked one upon another to form a flat cable structure. The arrays are patterned such that, for adjacent arrays in a set of stacked arrays, aligned pairs of conductors will have different crossing periodicities. Crosstalk reduction will, thus, be provided for adjacent pairs of conductors in the direction of array stacking, as well as for adjacent pairs of conductors within each array of the stack.

Every other array of the set of stacked arrays preferably provides a like pattern of periodicities of the crossings, such that no more than two different array configurations are required. Advantageously, the design may be further simplified by utilizing a single, appropriately ordered, laterally varying pattern of crossing periodicities for each array and simply reversing the disposition of each successive array in the set of stacked arrays.

In order to afford simplicity to mass terminating operations, it is preferred that the overall pattern of periodicities of the crossings repeat at known, regular intervals along the length of the flat cable. Moreover, for frequency independent crosstalk reduction, such crossing periodicities are usually set at even multiples. A binary series of periodicities is utilized to meet both of these conditions.

Additionally, it is considered desirable to compensate for possible misalignment between adjacent arrays in a set of stacked arrays. The pattern of periodicities for each array is, therefore, preferably selected such that conductor pairs of like periodicity in adjacent arrays will be separated laterally by two or more tracks, i.e., two or more conductor pair sites. Thus, adjacent arrays may be misaligned by a displacement of up to one track width, or more, without serious crosstalk effects resulting.

The flat cable structure of the invention, due to the various features outlined thus far, has significant crosstalk reduction capacity, yet is simple to utilize and to terminate, inexpensive to manufacture, and highly adaptable to a number of different uses.

BRIEF DESCRIPTION OF THE DRAWING

FIGS. 4 through 15 are schematic illustrations of a number of laterally varying patterns of conductor pair crossing periodicities which might be incorporated into the flat cable of FIG. 2.

DETAILED DESCRIPTION

Figure 1:
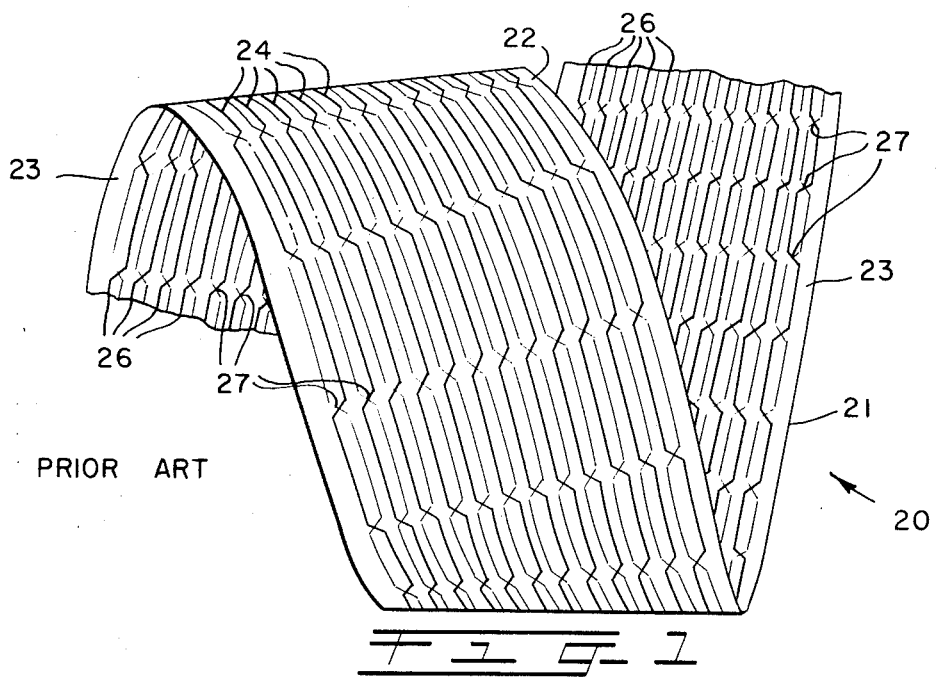
FIG. 1 of the drawing is an isometric illustration of a section of a flat cable known in the prior art, the cable including pairs of longitudinally extending electrical conductors with the conductors of each pair crossing over one another regularly, at like crossing periodicity for all the conductor pairs.

Referring to FIG. 1 of the drawing, a section of a prior art flat cable 20 is illustrated. The flat cable 20 takes the form of a strip 21 of dielectric tape having two opposite, major surfaces 22 and 23. A number of flat, longitudinally extending conductive paths 24,24, . . . are formed on one major surface 22 of the strip 21, and a like number of flat, longitudinally extending, conductive paths 26,26, . . . are formed on the other major surface 23. Generally aligned with each conductive path 24 on the major surface 22 is an associated conductive path 26 on the opposite major surface 23. The conductive paths of each pair of associated conductive paths 24 and 26 are spaced laterally from one another except at periodic locations 27,27, . . . along the pair of conductive paths, at which periodic locations the conductive paths cross one another. For every pair of associated conductive paths 24 and 26, the periodicity of the crossing locations 27,27 . . . is alike, i.e., the longitudinal distance between successive crossing locations is identical. Due to the correspondency in longitudinal crossing locations for adjacent pairs of associated conductive paths on the strip 21, crosstalk effects between the adjacent conductive path pairs are substantial.

Figure 2:
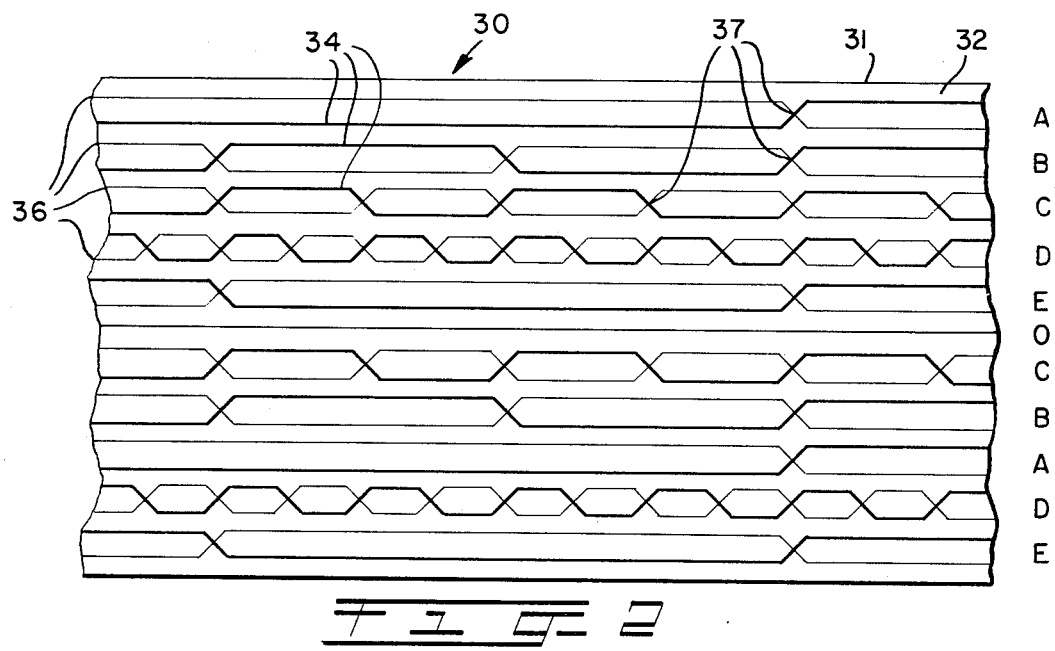
FIG. 2 is a plan view of a section of a flat cable formed in accordance with the principles of the invention, the cable including pairs of longitudinally extending electrical conductors with the conductors of each pair crossing over one another regularly, at crossing periodicities varying from conductor pair to conductor pair in order to reduce substantially any crosstalk effects between various circuit paths of the flat cable.

Turning next to FIG. 2 of the drawing, a section of an improved, single layer, flat cable structure 30 is shown. The flat cable 30 includes a dielectric matrix 31, which may take the form of a strip of a transparent dielectric tape, as depicted. On one major surface 32 of the tape there is located a number of flat, longitudinally extending, conductive paths 34, 34, . . . , while on an opposite, major surface of the tape, beneath the major surface 32 in FIG. 2, there is located a like number of flat, longitudinally extending, conductive paths 36,36, . . . Generally aligned with each conductive path 34 on the major surface 32 is an associated conductive path 36 on the opposite, major surface. The conductive paths of each pair of conductive paths 34 and 36 are spaced laterally from each other except at periodic locations 37,37, . . . along the pair of conductive paths, at which periodic locations the conductive paths cross one another.

As described thus far, the flat cable 30 is generally similar to the prior art flat cable 20. Before further describing the flat cable 30, however, it is considered useful to note that a number of alternatives to the structure depicted in FIG. 2 are also possible. Thus, the flat cable 30 need not constitute a strip of dielectric tape upon opposite, major surfaces of which flat, conductive paths 34,34, . . . , 36,36, . . . are formed. For example, the flat, conductive paths might be replaced by bare wires or by insulated wires twisted about one another so as to cross one another in a lateral plane at the periodic locations 37,37 . . . In addition, the dielectric matrix 31 might be provided by a woven strand structure or by a dielectric bonding or laminating material.

Figure 3:
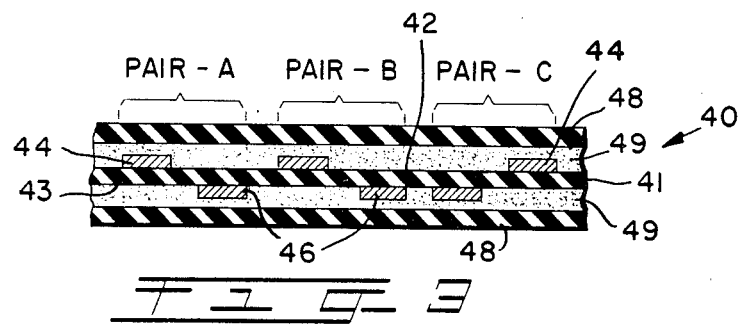
FIG. 3 is a lateral cross-sectional view of a section of flat cable corresponding to the flat cable structure of FIG. 2 wherein each pair of electrical conductors is formed by two electrically conductive paths formed on two opposite major surfaces of a flat, dielectric strip, and wherein insulation covers both major surfaces of the flat, dielectric strip.

It may also be seen that the structures shown in FIGS. 1 and 2 include no provision for insulating the flat, longitudinally extending conductive paths from one another and from surrounding electrically conductive elements. Such insulation would be important, for example, where stacked sets of layers of flat cable are to be employed. The structure illustrated in lateral cross-section in FIG. 3 provides such desirable insulation. In FIG. 3, the flat cable structure 40 includes a strip 41 of dielectric tape having opposite, major surfaces 42 and 43 on which pairs of associated conductive paths 44 and 46 extend longitudinally, in similar manner to the flat cables 20 and 30. Strips of dielectric tape 48,48 cover the major surfaces 42 and 43, the strips 48, 41 and 48 being bonded together with a dielectric adhesive 49.

The flat cable 30 of FIG. 2 departs from the prior art flat cable 20 of FIG. 1 in that a number of periodicities are provided for the periodic crossing locations 37,37, . . . in different ones of the pairs of associated conductive paths 34 and 36. The pattern of periodicities of the crossings varies laterally across the array formed by the pairs of associated conductive paths such that no two adjacent pairs of associated conductive paths have like crossing periodicities. Since the crossing locations 37,37, . . . along the length of the cable 30 do not correspond in the adjacent pairs of conductive paths, any crosstalk problem in the array of conductive paths is minimized.

As previously suggested, it is desirable for purposes of space economization that a compound layer, flat cable structure be formed by a stacked set of arrays, such as a stack of flat cable structures similar to the single layer, flat cable structure 30 of FIG. 2. Referring to FIG. 4, however, it may be observed that a simple stacking operation may not provide the crosstalk reduction desired for the flat cable 30. A stack formed by several, similarly oriented arrays of flat cable is depicted in FIG. 4, the pattern of periodicities varying laterally across each array in a like manner. The letters A, B, C, D, E, . . . are utilized to represent the distribution of crossing periodicities in each array, A representing a pair of associated conductive paths with a first crossing periodicity, B representing a pair of associated conductive paths with a second crossing periodicity different from that of pair A, C representing a pair of associated conductive paths with a third, and still different, crossing periodicity, etc. It is readily seen that each vertical column of aligned pairs of associated conductive paths in different arrays has like crossing periodicity. Thus, significant crosstalk effects will be present between aligned conductive path pairs in adjacent layers.

One possible solution to the problem of crosstalk effects between aligned pairs of associated conductive paths in adjacent arrays of a stacked set of arrays is illustrated in FIG. 5 of the drawing. Two varieties of single array, flat cable are utilized. A first flat cable array, designated type "a," has a first, laterally varying pattern of crossing periodicities, A, B, C, D, E, . . . A second flat cable array, designated type "b," has a second, laterally varying pattern of crossing periodicities, F, G, H, I, J, . . . The crossing periodicities of the type "a" array differ from those of the type "b" array. Thus, superimposition of one of the arrays on the other will not result in the presence of crosstalk effects between aligned pairs of associated conductive paths. Every alternating array of the set of stacked arrays is seen to be alike in FIG. 5, an array of type "b" cable being interspersed between every two proximate pairs of type "a" cable throughout the stack such that interarray crosstalk effects are not generated. Moreover, since all of the crossing periodicities A, B, C, D, E, . . . and F, G, H, I, J, . . . differ, neither the alignment of the arrays nor the particular orientation of each array is important. Thus, no care need be taken, for example, that any particular type "a" array not be reversed, providing a laterally varying pattern, E, D, C, B, A.

A second possible solution to the adjacent array crosstalk problem is suggested in FIGS. 6 and 7. The orientation of each successive array of the set of stacked arrays is simply reversed from that of the preceding array. For a non-repetitive pattern of lateral variation in crossing periodicities, A, B, C, D, E, . . . , the crossing periodicities in aligned pairs of associated conductive paths in adjacent arrays of a properly aligned, stacked set of arrays with alternated reversals will differ from each other in most (FIG. 6), if not all (FIG. 7), of the columns of conductive path pairs in the stack. In arrays having an odd number of periodicities, where reversal does not fully preclude the adjacency of aligned conductive path pairs with like crossing periodicity, as may be seen in the central column of aligned conductor pairs of like crossing periodicity C at the top of FIG. 6, a zero signal central column may be employed. This pattern is represented by the bottom two arrays of FIG. 6, the symbol O replacing the central column periodicity C. The zero signal central column may correspond to an absence of any conductive paths at the lateral center of each array, or to the presence of a single, central conductive path or of plural spaced, central conductive paths carrying no alternating frequency signal. Since the zero signal central column location does not generate signal crosstalk effects, the reversed array stacks shown at the bottom of FIG. 6 and in FIG. 7 solve the adjacent array crosstalk problem illustrated in FIG. 4.

One advantage of the single array solutions of FIGS. 6 and 7 over the two array solution of FIG. 5 lies in the fact that only a single type of array need be manufactured, stored and readily available at the appropriate sequencing time. A second advantage, which will next be explained more fully, lies in the lesser number of different periodicities required to make up the periodicity pattern in the arrays of FIGS. 6 and 7, as compared to that required in the pattern of FIG. 5.

As discussed previously, one advantage inherent in the use of flat cable involves the ease of termination provided by the presence of a regular, known position array of conductive paths in the flat cable. The introduction into flat cable structures of pairs of associated conductive paths which cross one another at different crossing periodicities tends somewhat to complicate this situation, but termination will still be a relatively simple matter if a suitable pattern of periodicity is selected for the flat cable. In order to simplify termination, it is advisable that the overall pattern of periodicities be repetitive at frequent, known locations along the length of the flat cable.

One way in which an overall pattern repetitivity may be readily achieved in flat cable involves the use of patterns of periodicities according to which the various periodicities follow a binary geometric progression, for example, $d$, $2d$, $4d$, $8d$, . . . , where $d$ is a minimum desired spacing between successive crossings in any pair of associated conductor paths. Thus, five pairs of associated conductive paths may be utilized in a flat cable in accordance with a laterally varying pattern of crossing periodicities having appropriately distributed periodicities A, B, C, D, E varying in accordance with the binary geometric progression $d$, $2d$, $4d$, $8d$, $16d$. At every length $16d$, the overall pattern of periodicities will repeat. Accordingly, at every length 16d, the order of conductive path locations laterally across the flat cable will be alike, knowledge of the conductive path locations permitting easy termination at such length. The flat cable may be marked at regular intervals along its length, e.g., by sixteen successive letters at regular spacings equal to the minimum desired spacing d. The markings will aid in termination due to their correspondence to particular sequences of conductive paths across the width of the cable at the marked locations.

The length of repetition of the overall pattern of periodicities, e.g., $16d$, is preferably made as short as possible in order to simplify termination. Thus, an unduly large number of different periodicities is to be avoided, since the addition of each further periodicity to the geometrically varied, binary periodicity pattern $d$, $2d$, $4d$, $8d$, . . . doubles the length of repetition of the overall pattern. Accordingly, a relatively small number of periodicities in a periodicity pattern, as present in the alternatingly reversed arrays of FIGS. 6 and 7, is advantageous.

One possible problem which might be caused by the alternatingly reversed array format is suggested by a comparison of FIGS. 7 and 8 of the drawing. So long as the various arrays in a stacked set of arrays are properly aligned, as shown in FIG. 7, adjacent pairs of associated conductive paths will have different periodicities. However, as shown in FIG. 8, any misalignment in the set of stacked arrays may bring two like periodicity pairs of associated conductive paths into alignment, e.g., in the columns of associated conductive path pairs of crossing periodicities C and D. Thus, suitable periodicity patterns which will compensate for misalignment are necessary.

Turning now to FIG. 9 of the drawing, one possible design for overcoming the stacking misalignment problem utilizes a flat cable array having a pattern of associated conductive path crossing periodicites A, B, C, D, O, B, A, D, C. It may be noted that this pattern employs only four different crossing periodicities for signal-supporting path pairs. A properly aligned stack of arrays is illustrated, the orientation of each successive array and, thus, of the pattern of periodicities in each successive array being reversed from that of the preceding array. As was true in the case of the stacked set of flat cable arrays of FIG. 7, the signal-supporting crossing periodicities differ between adjacent pairs of associated conductive paths both within each individual array and in aligned columns of adjacent arrays.

However, the crossing periodicities also differ between any given pair of associated conductive paths in a first of two adjacent arrays and the two pairs of associated conductive paths, located in the second of the two adjacent arrays, which are proximate to each side of the pair of associated conductive paths in the second array aligned with the given pair of paths in the first array. The design of the flat cable array of FIG. 9 is, thus, seen to provide a two track displacement between pairs of associated conductive paths having like crossing periodicity in adjacent arrays of the stacked set of arrays. Accordingly, a one track misalignment of a flat cable array to either side of its proper position will not result in an alignment of associated conductive path pairs of like crossing periodicity. This may be seen quite clearly in FIG. 10.

A five periodicity pattern, flat cable array which will tolerate one track misalignment is depicted in FIG. 11 of the drawing. The pattern of periodicitieS may be seen to be A, B, C, D, E, O, A, B, E, D, C. The nondetrimental effect of one track misalignment may be observed in FIG. 12. Other, five periodicity pattern, flat cable arrays will also allow one track misalignment without pairs of associated conductive paths having like crossing periodicity being brought into alignment, e.g., the periodicity pattern, A, B, C, D, E, O, C, B, A, D, E of the flat cable array of FIG. 2.

In some instances, it might be expected to encounter such misalignment as might cause two track displacement, or even three track displacement, between adjacent arrays. Alternatively, an AC signal frequency might be such as to require a three track displacement between pairs of associated conductive paths of like crossing periodicity in adjacent arrays in order to provide a sufficient reduction in electromagnetic coupling. Appropriate flat cable arrays may be designed to permit reversed array stacking characterized by a displacement of two or three tracks, or more, between such like periodicity locations. The pattern of periodicities, A, B, C, D, E, F, O, O, C, B, A, F, E, D, shown in FIG. 13 of the drawing, for example, tolerates a two track displacement. The pattern, A, B, C, D, E, F, G, H, O, O, O, D, C, B, A, H, G, F, E, illustrated in FIG. 14, allows a three track displacement. Other periodicity patterns are also possible for providing similar separation between like crossing periodicity pairs of associated conductive paths in adjacent arrays. In general, all such alternatingly reversed array stacks require that one or more zero signal central tracks have zero crossing be employed in order to provide the necessary lateral displacement at the center of adjacent, reversed pattern arrays to compensate for expected misalignment.

An alternative technique for permitting some misalignment, one track misalignment in the example shown, is suggested in FIG. 15. The alternative technique, as in the case of the scheme of FIG. 5, employs two different types of flat cable array, a type "a" array and a type "b" array, providing the respective periodicity patterns, A, B, C, D, A, B, C, D and C, D, A, B, C, D, A, B. The type "a" and type "b" arrays are alternated in a stack of arrays. As may be seen in FIG. 15, no like crossing periodicities are present in any two adjacent pairs of associated conductive paths in the same array or in adjacent arrays. Moreover, a two track separation is present with respect to like crossing periodicities in pairs of associated conductive paths in adjacent arrays, allowing one track misalignment to occur without serious crosstalk generation effects. One advantage of using two types of array involves the elimination of any necessity for central, zero signal positions in an array.

The last several embodiments discussed allow two or more track displacement between pairs of associated conductor paths of like periodicity in adjacent arrays, permitting nondetrimental misalignment to the extent of at least one track displacement. The various arrays in a stack may, however, be aligned relatively accurately through the use of suitable facilities for stacking, e.g., a stacking channel having an adequate depth and having side walls spaced apart by a distance only very slightly greater than the width of an array of flat cable.

It is to be understood that the described electrically conductive structures are simply illustrative of certain embodiments of the invention. It may be noted that such structures need not be confined to flat cable uses, but may be also be utilized in etched printed circuits or printed circuits formed by additive deposition techniques, such as double-sided or multilayer, laminate structures with closely spaced signal circuits which have low crosstalk requirements. In such case, structures in accordance with the principles of the invention may be employed so as to obviate or make less necessary the use of metallic ground planes in order to reduce crosstalk bY shielding. Many other modifications may also be made without departing from the invention.

What is claimed is:

1. An electrically conductive structure which comprises:
   a plurality of pairs of elongated electrical conductors extending generally in like longitudinal direction, and disposed in a substantially flat array, the conductors of each pair being spaced laterally except at periodic crossings along the pair where the conductors exchange lateral positions, the periodicities of the crossings differing in adjacent pairs, the periodicities of the crossings also differing in corresponding pairs spaced at like but opposite distances from an imaginary centerline of the array, so that when a first such array is emplaced upon a reversed, second such array, the periodicity of a pair in the first array will differ from the periodicity of an aligned pair in the second array; and
   dielectric means for separating adjacent conductors.

2. In the electrically conductive structure of claim 1:
   the overall pattern of periodicities of the crossings repeating regularly along the length of the first array, said periodicities varying in accordance with a binary relationship.

3. In the electrically conductive structure of claim 1:
   said dielectric means comprising a central, dielectric member; and
   said elongated electrical conductors each being located in fixed relationship with respect to said central, dielectric member, one conductor of each pair of conductors disposed on one side of the central, dielectric member, and the other conductor of the pair of conductors disposed on a second and opposite side of the central, dielectric member.

4. In the electrically conductive structure of claim 1:
   said elongated electrical conductors each comprising an insulated wire, pairs of the insulated wires being twisted about one another to provide said crossings, the insulation on each wire forming at least a part of said dielectric means.

5. In the electrically conductive structure of claim 1: the periodicity of a particular pair also differing from the periodicity of a pair that is adjacent to the corresponding like-spaced pair, so that when a first such array is emplaced upon a reversed, second such array, the periodicity of a pair in the first array will also differ from the periodicity of a pair in the second array that is adjacent to the aligned pair, providing at least a two-track displacement between pairs having like periodicity in the first and second arrays.

6. In the electrically conductive structure of claim 5: the periodicity of a particular pair also differing from the periodicity of a pair that is next-but-one to the like-spaced pair, so that when a first such array is emplaced upon a reversed, second such array, the periodicity of a pair in the first array will also differ from the periodicity of a pair in the second array that is next-but-one to the aligned pair, providing at least a three-track displacement between pairs having like periodicity in the first and second arrays.

7. In the electrically conductive structure of claim 5: the overall pattern of periodicities of the crossings repeating regularly along the length of the first array, said periodicities varying in accordance with a binary relationship.

8. In the electrically conductive structure of claim 5: said dielectric means comprising a central, dielectric member; and
said elongated electrical conductors each being located in fixed relationship with respect to said central, dielectric member, one conductor of each pair of conductors disposed on one side of the central, dielectric member, and the other conductor of the pair of conductors disposed on a second and opposite side of the central, dielectric member.

9. In the electrically conductive structure of claim 5: said elongated electrical conductors each comprising an insulated wire, pairs of the insulated wires being twisted about one another to provide said crossings, the insulation on each wire forming a part of said dielectric means.

10. In an electrically conductive structure:
a stacked set of substantially flat arrays of elongated electrical conductors, each array including a plurality of pairs of the conductors extending generally in like longitudinal direction, the conductors of each pair of conductors being spaced laterally from one another except at periodic locations along the pair of conductors at which periodic locations the conductors of the pair exchange lateral positions by crossing over one another, the periodicities of the crossings differing in adjacent pairs of conductors in each individual array, the periodicities of the crossings also differing in aligned pairs of conductors in adjacent arrays of the stacked set of arrays; and
dielectric means for separating adjacent conductors from one another.

11. In the electrically conductive structure of claim 10:
the overall pattern of periodicities of the crossings in each individual array repeating regularly along the length of the array, said periodicities varying in accordance with a binary relationship.

12. In the electrically conductive structure of claim 10:
every other array of the set of stacked arrays having a like pattern of periodicities of the crossings.

13. In the electrically conductive structure of claim 12:
the pattern of periodicities of the crossings being reversed in each successive array in the set of stacked arrays.

14. In the electrically conductive structure of claim 10:
said dielectric means comprising a central, dielectric member associated with each pair of conductors in an array; and
said elongated electrical conductors in each array each being located in fixed relationship with respect to said associated, central, dielectric member, one conductor of each pair of conductors disposed on one side of the central, dielectric member, and the other conductor of the pair of conductors disposed on a second and opposite side of the central, dielectric member.

15. In the electrically conductive structure of claim 10:
said elongated electrical conductors in each array each comprising an insulated wire, pairs of the insulated wires being twisted about one another to provide said crossings, the insulation on each wire forming a part of said dielectric means.

16. In the electrically conductive structure of claim 10:
the periodicities of the crossings further differing in each pair of first and second adjacent arrays between each pair of conductors in the first array and the pairs of conductors in the second array proximate to each side of the pair of conductors in the second array aligned with the pair of conductors in the first array, providing at least a two track displacement between conductor pairs of like periodicity in the first and second adjacent arrays.

17. In the electrically conductive structure of claim 16:
the pattern of periodicities of the crossings varying laterally across each array in such manner as to provide at least a three track displacement between conductor pairs of like crossing periodicity in the first and second adjacent arrays.

18. In the electrically conductive structure of claim 16:
the overall pattern of periodicities of the crossings repeating regularly along the length of each array, said periodicities varying in accordance with a binary relationship.

19. In the electrically conductive structure of claim 16:
every other array of the set of stacked arrays having a like pattern of periodicities of the crossings.

20. In the electrically conductive structure of claim 19:
the pattern of periodicities of the crossings being reversed in each successive array of the set of stacked arrays.

21. In the electrically conductive structure of claim 19:

said dielectric means comprising a central, dielectric member associated with each pair of conductors in an array; and said elongated electrical conductors in each array each being located in fixed relationship with respect to said associated, central, dielectric member, one conductor of each pair of conductors disposed on one side of the central, dielectric member, and the other conductor of the pair of conductors disposed on a second and opposite side of the central, dielectric member.

22. In the electrically conductive structure of claim 19:

said elongated electrical conductors in each array each comprising an insulated wire, pairs of the insulated wires being twisted about one another to provide said crossings, the insulation on each wire forming a part of said dielectric means.

23. In an electrically conductive structure:

a stacked set of flat, dielectric strips each having two opposite, major surfaces;

a like number of electrically conductive paths on each major surface of each strip extending generally longitudinally of the strip, each path on one major surface of a strip being located in proximity to an associated path on the other major surface of the strip, the paths of each pair of associated paths being spaced laterally from one another except at periodic locations along the pair of paths at which periodic locations the paths of the pair exchange lateral positions by crossing over one another, the periodicities of the crossings differing in adjacent pairs of associated paths on each individual strip, the periodicities of the crossings also differing in aligned pairs of associated paths in adjacent strips of the stacked set of strips; and a dielectric medium interposed between each adjacent pair of strips in the set of stacked strips to insulate the paths of adjacent strips one from another.

24. In the electrically conductive structure of claim 23:

the overall pattern of periodicities of the crossings in the various conductive paths on each strip repeating regularly along the length of the strip, said periodicities varying in accordance with a binary relationship.

25. In the electrically conductive structure of claim 24:

every other strip of the set of stacked strips having a like pattern of periodicities of the crossings.

26. In the electrically conductive structure of claim 25:

the pattern of periodicities of the crossings being reversed for each successive strip in the set of stacked strips.

27. In the electrically conductive structure of claim 23:

the periodicities of the crossings further differing in each pair of first and second adjacent strips of the stacked set between each pair of associated paths on the first strip and the pairs of associated paths on the second strip proximate to each side of the pair of associated paths in the second strip aligned with the pair of associated paths in the first strip, providing at least a two track displacement between pairs of associated paths of like crossing periodicity in the two adjacent strips.

28. In the electrically conductive structure of claim 27:

the pattern of the periodicity of the crossings in each strip varying laterally across the strip in such manner as to provide at least a three track displacement between pairs of associated paths of like crossing periodicity in the first and second adjacent strips.

29. In the electrically conductive structure of claim 27:

the overall pattern of periodicities of the crossings in the various conductive paths repeating regularly along the length of each strip, said periodicities varying in accordance with a binary relationship.

30. In the electrically conductive structure of claim 29:

every other strip of the set of stacked strips having a like pattern of periodicities of the crossings.

31. In the electrically conductive structure of claim 30:

the pattern of periodicities of the crossings being reversed for each successive strip in the set of stacked strips.

32. An electrically conductive structure which comprises:

a flat, dielectric strip having two opposite major surfaces; and a like number of electrically conductive paths on each major surface of the strip extending generally longitudinally along the strip and spaced laterally across the strip, each path on one major surface being paired with a path on the other major surface, the paths of each pair being laterally spaced except at periodic crossings along the pair where the paths exchange lateral positions, the periodicities of the crossings differing in adjacent pairs, the periodicities of the crossings also differing in corresponding pairs spaced at like but opposite distances from an imaginary centerline of the strip, so that when a first such strip is emplaced upon a reversed second such strip, the periodicity of a pair on the first strip will differ from the periodicity of an aligned pair on the second strip.

33. In the electrically conductive structure of claim 32:

the periodicity of a particular pair also differing from the periodicity of a pair that is adjacent to the corresponding like-spaced pair, so that when a first such strip is emplaced on a reversed, second such strip, the periodicity of a pair on the first strip will also differ from the periodicity of a pair on the second strip that is adjacent to the aligned pair, providing at least a two-track displacement between pairs having like periodicity on the first and second strips.

34. In the electrically conductive structure of claim 33:

the periodicity of a particular pair also differing from the periodicity of a pair that is next-but-one to the corresponding like-spaced pair, so that when a first such strip is emplaced on a reversed, second such strip, the periodicity of a pair on the first strip will also differ from the periodicity of a pair on the second strip that is next-but-one to the aligned pair, providing at least a three-track displacement between pairs having like periodicity on the first and second strips.

35. In the electrically conductive structure of claim 33:

the overall pattern of periodicities of the crossings in the various associated paths repeating regularly along the length of the first strip, said periodicities varying in accordance with a binary relationship.

36. In the electrically conductive structure of claim 32:

the overall pattern of periodicities of the crossings in the various pairs of associated paths repeating regularly along the length of the first strip, said periodicities varying in accordance with a binary relationship.

* * * * *

L-566-PT
(6-69)

UNITED STATES PATENT OFFICE
CERTIFICATE OF CORRECTION

Patent No. 3,764,727     Dated October 9, 1973

Inventor(s) JOHN WILLIAM BALDE Case-8

It is certified that error appears in the above-identified patent and that said Letters Patent are hereby corrected as shown below:

In the Title page, column 2, "Attorney - W. M. Kain et al." should read --Attorneys - Jack Schuman and Arthur S. Rosen--.

Column 7, line 19, "periodicitieS" should read --periodicities-- line 49, delete "have zero crossing".

Column 8, line 27, "bY" should read --by--.

Signed and sealed this 5th day of March 1974.

(SEAL)
Attest:

EDWARD M. FLETCHER, JR.
Attesting Officer

C. MARSHALL DANN
Commissioner of Patents